US012277725B2

(12) United States Patent
Dos Santos Mendonca et al.

(10) Patent No.: US 12,277,725 B2
(45) Date of Patent: Apr. 15, 2025

(54) ENHANCED EYE TRACKING SYSTEMS UTILIZING JOINT BIOLOGICAL AND HARDWARE ESTIMATIONS

(71) Applicant: MICROSOFT TECHNOLOGY LICENSING, LLC, Redmond, WA (US)

(72) Inventors: Paulo Ricardo Dos Santos Mendonca, Seattle, WA (US); Rayna Demaster-Smith, Redmond, WA (US); Christopher Charles Aholt, Newcastle, WA (US); Christopher Maurice Mei, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 519 days.

(21) Appl. No.: 17/506,632

(22) Filed: Oct. 20, 2021

(65) Prior Publication Data
US 2023/0119633 A1   Apr. 20, 2023

(51) Int. Cl.
*G06T 7/73* (2017.01)
*G02B 27/00* (2006.01)
(Continued)

(52) U.S. Cl.
CPC .............. *G06T 7/73* (2017.01); *G02B 27/017* (2013.01); *G06T 7/80* (2017.01); *G06V 40/19* (2022.01);
(Continued)

(58) Field of Classification Search
CPC ... G06T 7/73; G06T 7/80; G06T 2207/30201; G06T 2207/30244; G06V 40/19;
(Continued)

(56) References Cited

U.S. PATENT DOCUMENTS 10,417,784 B1 *  9/2019  Cavin .................... G06V 40/19
11,423,569 B1 *  8/2022  Carlsson ............ G02B 27/0093
(Continued)

OTHER PUBLICATIONS

"Non Provisional Application Filed in U.S. Appl. No. 17/199,241", filed Mar. 11, 2021, 50 Pages.
(Continued)

*Primary Examiner* — Siamak Harandi
*Assistant Examiner* — Daniella M. DiGuglielmo
(74) *Attorney, Agent, or Firm* — Scott Y. Shigeta; Newport IP, LLC

(57) ABSTRACT

The disclosed techniques provide enhanced eye tracking systems utilizing joint estimation of biological parameters and hardware parameters. A system uses joint estimation of biological parameters, e.g., direction and position of an eye, with concurrent estimation of hardware parameters, e.g., camera position or camera direction, to self-calibrate and provide eye tracking estimations to accommodate for deformations and other changes of a device. Sensor data is used to select hardware parameters of a camera for use in the joint estimation with the biological parameters, where the hardware parameters are estimated based on glint and pupil position of a user. The disclosed techniques include a method to model changes of a device, as well as detect and compensate for them while the eye-tracking device is in normal use, without requiring a factory-calibration procedure to be repeated.

20 Claims, 9 Drawing Sheets

(51) Int. Cl.
  *G02B 27/01* (2006.01)
  *G06T 7/80* (2017.01)
  *G06V 40/19* (2022.01)

(52) U.S. Cl.
  CPC .. *G02B 27/0093* (2013.01); *G02B 2027/0178* (2013.01); *G02B 2027/0187* (2013.01); *G06T 2207/30201* (2013.01); *G06T 2207/30244* (2013.01)

(58) Field of Classification Search
  CPC .......... G02B 27/017; G02B 2027/0178; G02B 2027/0187; G02B 27/0093
  See application file for complete search history.

(56) References Cited

U.S. PATENT DOCUMENTS

| | | | |
|---|---|---|---|
| 2014/0055591 A1* | 2/2014 | Katz | G06F 21/32 |
| | | | 348/78 |
| 2020/0348755 A1* | 11/2020 | Gebauer | G06V 10/82 |
| 2020/0349907 A1* | 11/2020 | Neustein | G06F 3/147 |
| 2021/0105456 A1 | 4/2021 | Edwin et al. | |
| 2021/0181840 A1* | 6/2021 | Vlaskamp | G02B 27/0172 |
| 2022/0206565 A1* | 6/2022 | Halmetschlager-Funek | |
| | | | G06F 3/038 |

OTHER PUBLICATIONS

"International Search Report and Written Opinion Issued in PCT Application No. PCT/US22/041438", Mailed Date: Nov. 25, 2022, 9 Pages.

* cited by examiner

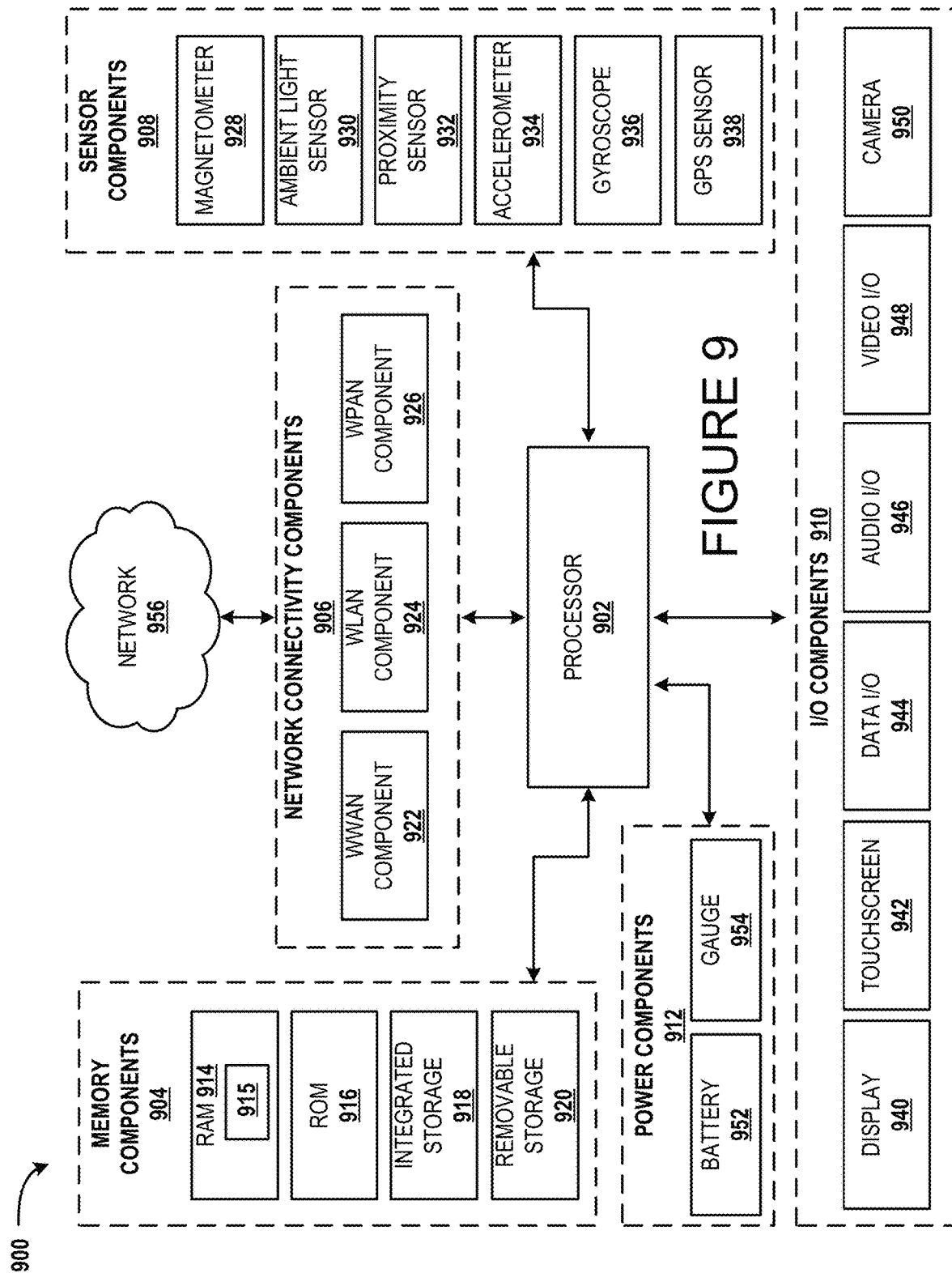

ENHANCED EYE TRACKING SYSTEMS UTILIZING JOINT BIOLOGICAL AND HARDWARE ESTIMATIONS

BACKGROUND

Eye tracking systems can utilize a process of estimating ocular parameters such as the position and orientation of a person's eyes. The system can estimate the ocular parameters with respect to a known reference or coordinate system. The system can also estimate other ocular parameters such as the location and radius of a person's pupil. Some eye-tracking systems rely on calibration data defining the relative position of eye-tracking cameras. This can involve the use of one or more cameras per eye and light-emitting diodes for illuminating the eyes. The calibration data can be generated during a manufacturing process, e.g., factory calibration, which is a deliberate and involved procedure requiring specialized equipment and performed in a highly controlled setting. If the ocular parameters estimated during device calibration change in an uncompensated manner, the accuracy of the estimates of ocular parameters produced by the eye-tracking system may degrade. Such issues can be exacerbated when a system involves a smaller form factor that does not offer the same support as a larger headset. Devices that have smaller, flexible components can cause parts, such as cameras and light emitting diodes to move relative to one another.

While ocular parameters change at a rate governed by biological processes (e.g., speed of pupil dilation or constriction, speed of saccadic eye movements, and duration of fixations), changes in device parameters are governed by physical processes that occur at different time scales. For example, after a drop of an eye-tracking device, geometric properties of the device may change almost instantaneously due to mechanical deformations, but they may be compensated for during a relatively lengthy period of a few seconds while a user readjusts the device for use. Temperature-driven changes, on the other hand, tend to be slow and may require compensation only after a significant alteration in device parameters is detected. Existing calibration methods are not designed to effectively address these different types of changes causing a reduction in accuracy for some eye tracking systems.

SUMMARY

The techniques disclosed herein provide enhanced eye tracking systems utilizing joint estimation of biological parameters and hardware parameters. By the use of joint estimation of biological parameters, e.g., direction and position of an eye, with concurrent estimation of hardware parameters, e.g., camera position or camera direction, a system can self-calibrate and provide eye tracking estimations that can allow a system to accommodate for deformations and other changes of a device. The disclosed techniques include a method to model changes of a device, as well as detect and compensate for them while the eye-tracking device is in normal use, thereby preserving the performance of the system without requiring a factory-calibration procedure to be repeated.

The disclosed techniques can compensate for changes in parameters of an eye-tracking device. Changes in parameters of a device may come from a force applied to a device, a temperature change, deformations caused by aging, or any other physical change to a device or its components. An eye tracking process can utilize data acquired during normal use of the device, such as glints, i.e., reflections of the LEDs on the outer surface of the eye, pupil and limbus images, or other ocular features. In some eye-tracking methods, these types of data are already used as inputs to the procedure that estimates the ocular parameters regularly produced as an output of the eye-tracking device. A step in this estimation process is the computation of differences between image measurements such as glint and pupil locations and predicted values of these features given putative values of relevant ocular parameters. These differences are then used as a cost function to drive the estimation of the ocular parameters produced as an output of the eye-tracking system. The disclosed techniques augment eye tracking processes estimating biological features, such a position and direction of an eye with simultaneous estimations of select hardware parameters that may have changed after factory calibration. The same cost function used in regular eye tracking may be employed in the augmented procedure, with changes in the optimization method to accommodate for the inclusion of extra parameters.

In some configurations, hardware parameters may not change continuously. Some hardware parameters may be predetermined based on a device type, a use environment or other factors. Some hardware parameters may also be selected in response to the detection of a predetermined event, such as the detection of a threshold level of error in a measurement, the detection of a threshold level of acceleration, or the detection of a threshold level of temperature change. In some configurations, one or more detected events can also be used to determine the timing of when one or more select hardware parameters are used in an eye tracking process. The timing of when select hardware parameters are used can include the selection of one or more intervals of when select hardware parameters are used.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 9 is a computer architecture diagram illustrating a computing device architecture for a computing device capable of implementing aspects of the techniques and technologies presented herein.

DETAILED DESCRIPTION

Figure 1:
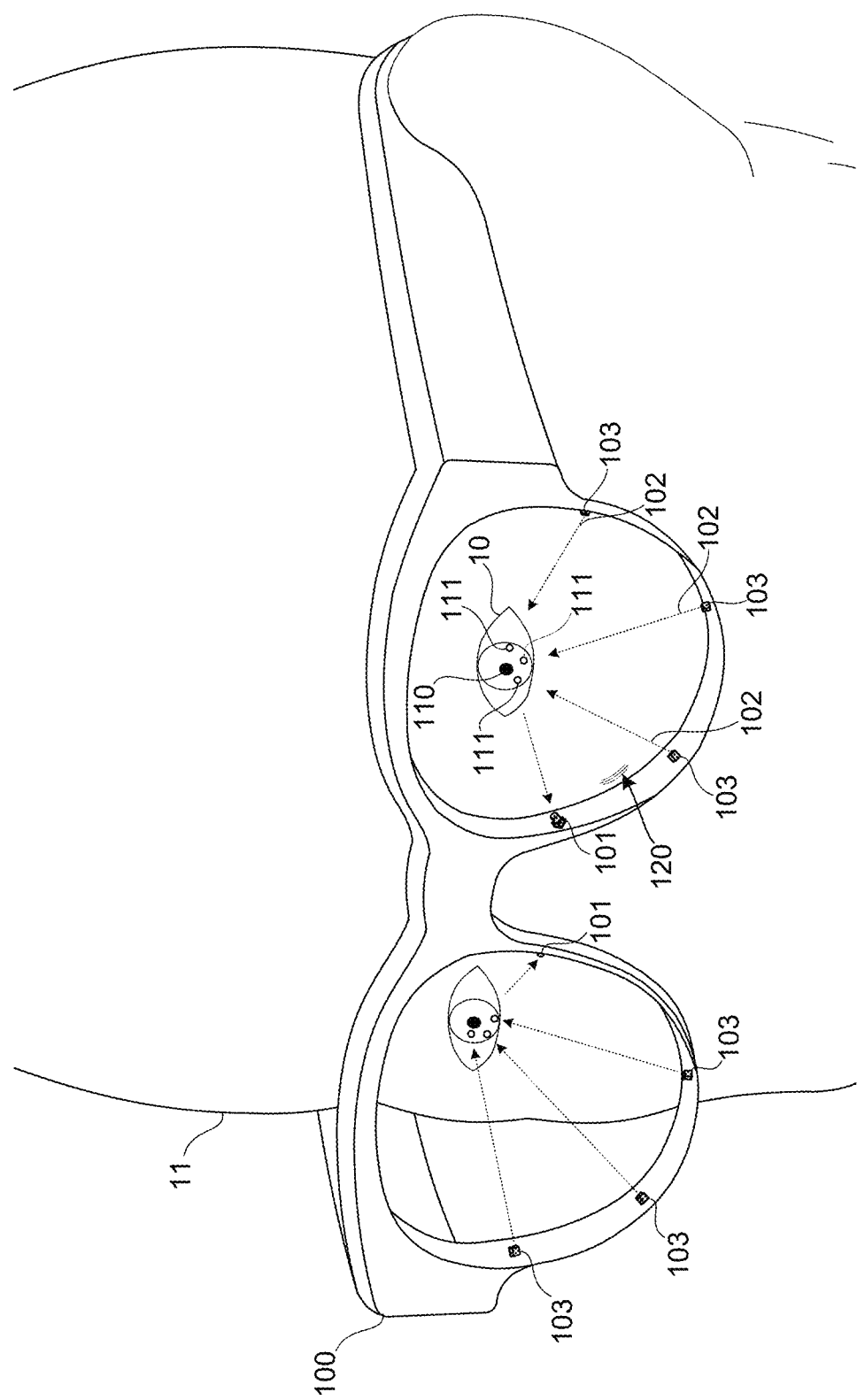
FIG. 1 is a perspective view of a display device having multiple sensors and light sources used for tracking at least one eye of a person.

FIG. 1 is a perspective view of a device 100 having at least one sensor 101 used for tracking at least one eye 10 of a user 11 (e.g., a person). In some configurations, the device 100 can be in the form of a near-to-eye display device that can include a number of sensors 101 used for tracking the movement of the person's eye 10. The device 100 can also include light sources 103 that are mounted to the device in predetermined locations relative to the sensors 101. The light sources can be configured to admit a predetermined spectrum of light, such as infrared light. The device can also include semi-transparent lenses 120 that can enable a user to concurrently view real-world objects in a surrounding environment with rendered objects displayed on the lenses 120. The device 100 may also operate with semi-transparent lenses that allow the user 10 of the device 100 to concurrently view computer generated renderings as an overlay on real-world objects in the user's surrounding environment. Such configurations may also include display components that enable the device 100 to operate as an augmented reality device or a virtual reality device. The device 100 can also be configured to operate with fully transparent lenses to allow the user 11 of the device to view real-world objects and other display screens while allowing the device 100 to track the movement of the user's eyes. The sensors can be in the form of cameras directed to each eye. The sensors 101 and the light sources 103 can be controlled by computing components of the device 100, which are described in more detail below. For illustrative purposes, the sensors 101 can also be referred to herein as "cameras 101."

Figure 2:
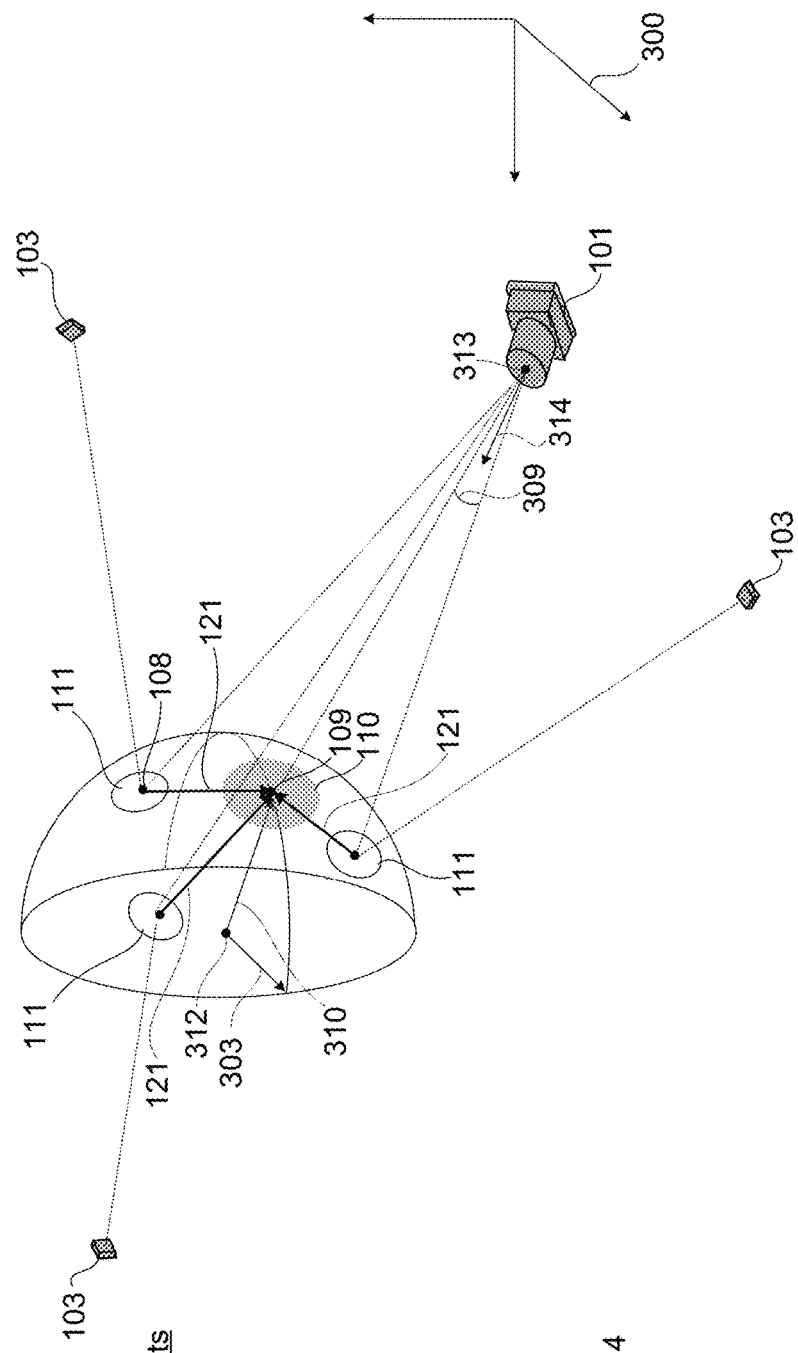
FIG. 2 is a perspective view of a model of an eye relative to a sensor and light sources.

With reference to FIG. 2, the light sources 103 can be configured to project infrared light 102 toward the eye 10. The infrared light 102 can reflect from the eye 10 and create a number of glints 111. The device can identify the glints 111 based on detected reflections of the infrared light 102 from the eye 10. Then, using at least one camera 101, the device 100 can determine a pupil position 109 of a pupil 110 of the eye 10, wherein a position of the plurality of glints 111 and the pupil position 109 is determined by an analysis of image data generated by the camera 101. For example, the position of the plurality of glints 111 and the pupil position 109 can be measured by the use of predetermined data, such as data defining the position of the lights 103 relative to the camera 101, angles 309 that are determined based on the location of each ocular feature, e.g., the glints, the pupil, iris, or any other identifiable marking or imperfections on the eye.

Using the position of the ocular features, the device can generate biological estimation data defining biological parameters. The biological parameters can include any parameter that describes, quantifies or identifies a feature of the eye. For example, a biological parameter can include an orientation, position, or shape of the eye 10. The orientation and the position of the eye can be estimated based on the position 108 of the plurality of glints 111 and the pupil position 109 of the pupil 110. The estimation can include the use of a model that can define a number of vectors 121 between each ocular feature as well as other measurements such as the radius 303 of the eye, etc. The orientation 310 and a position 312 of the eye 10 can be defined by any data value, such as a coordinate or vector, suitable for indicating a direction and/or location relative to a coordinate system 300.

Also using the position of the ocular features, the device can generate hardware estimation data defining one or more hardware parameters of the camera 101. The hardware parameters can include any parameter that describes, quantifies or identifies a feature of the camera or the device, such as but not limited to, a location of the camera, a direction of the camera, a focal length of the camera, etc. The hardware parameters can also indicate a position of an LED relative to a camera, a direction of an LED, a type of LED, power level of an LED, etc. The position 313 and the orientation 314 of the camera 101 can be defined by any data value, such as a coordinate or vector, suitable for indicating a direction and/or location relative to a coordinate system 300. In one example, the one or more hardware parameters of the camera 101 is estimated based on the position 108 of the plurality of glints 111 and the pupil position 109 of the pupil 110. This can be estimated using a model and other predetermined values, such as data indicating the shape of the eye, data indicating an initial location of the lights and the camera, etc.

Figure 3:
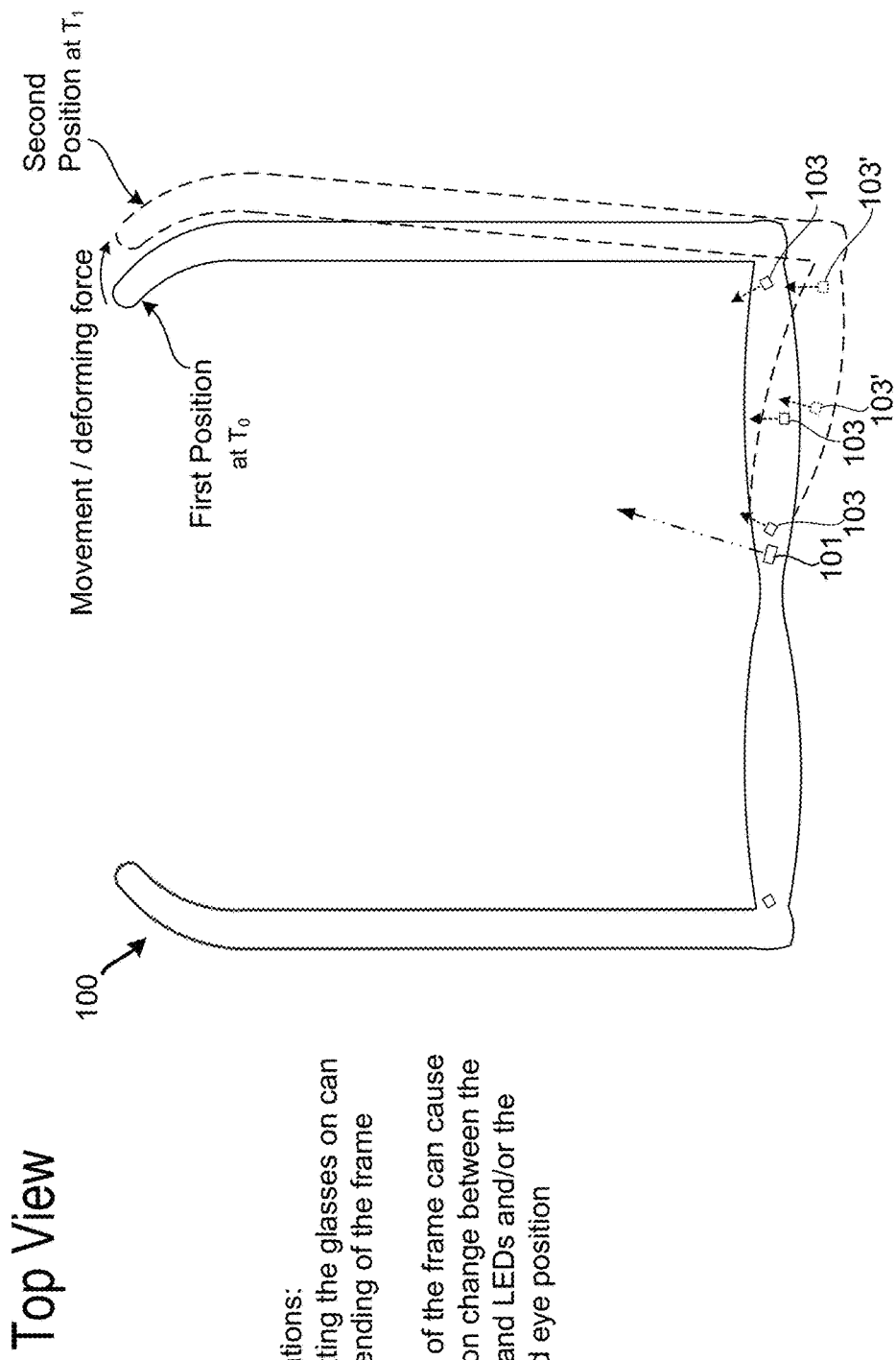
FIG. 3 is a top view of a display device that is undergoing a physical change that may impact the tracking sensors.

As will be described below, the estimation of the one or more hardware parameters of the camera 101 and the estimation of biological parameters can be done jointly. This joint estimation enables the device to generate data defining an orientation 310 and the position 312 of the eye 10 that has a high level of accuracy even if the device is subjected to a physical change, such as a deformation of the device frame. For example, as shown in FIG. 3, if the frame of the device 100 is bent, the orientation and position of the lights may change relative to a sensor 101. In this example, a portion of the device is bent. At time $T_0$ the right side of the frame starts at a first position, and when a force is applied at time $T_1$, the right side of the frame ends at a second position. As shown, this type of deformation can cause the lights to change their position and orientation relative to the camera 101. The lights at the second position, denoted as 103', can cause a device to have inaccurate estimations with respect to an eye position for and eye direction if the device is calibrated with the lights at the first position, denoted as 103.

The physical changes to the device shown in FIG. 3 can affect a model used for estimations in a number of different ways. For example, in FIG. 4, if the camera or a light source moves with respect one another, as shown in the movement of the first light 103A, a glint produced by that light and detected by the camera can move as well. If the device is relying on data that indicates the initial position and direction of the light relative to the camera, a measurement and estimation of a position and/or direction of the eye can be inaccurate. As described herein, the joint estimation of the hardware parameters and the biological parameters allows the device to detect such physical changes and to produce an output that accommodates those physical changes to produce a more accurate output defining one or more biological parameters.

This example is provided for illustrative purposes and is not to be construed as limiting. It can be appreciated that the techniques disclosed herein can enable the device to produce an accurate estimation of any ocular parameter, e.g., the position, shape, or orientation of an eye, even when the device is subjected to any type of physical change. The self-calibration techniques described herein utilizing the joint estimation of hardware parameters and biological parameters can allow the device to accommodate any physical change including the deformation shown in FIG. 3.

Figure 5:
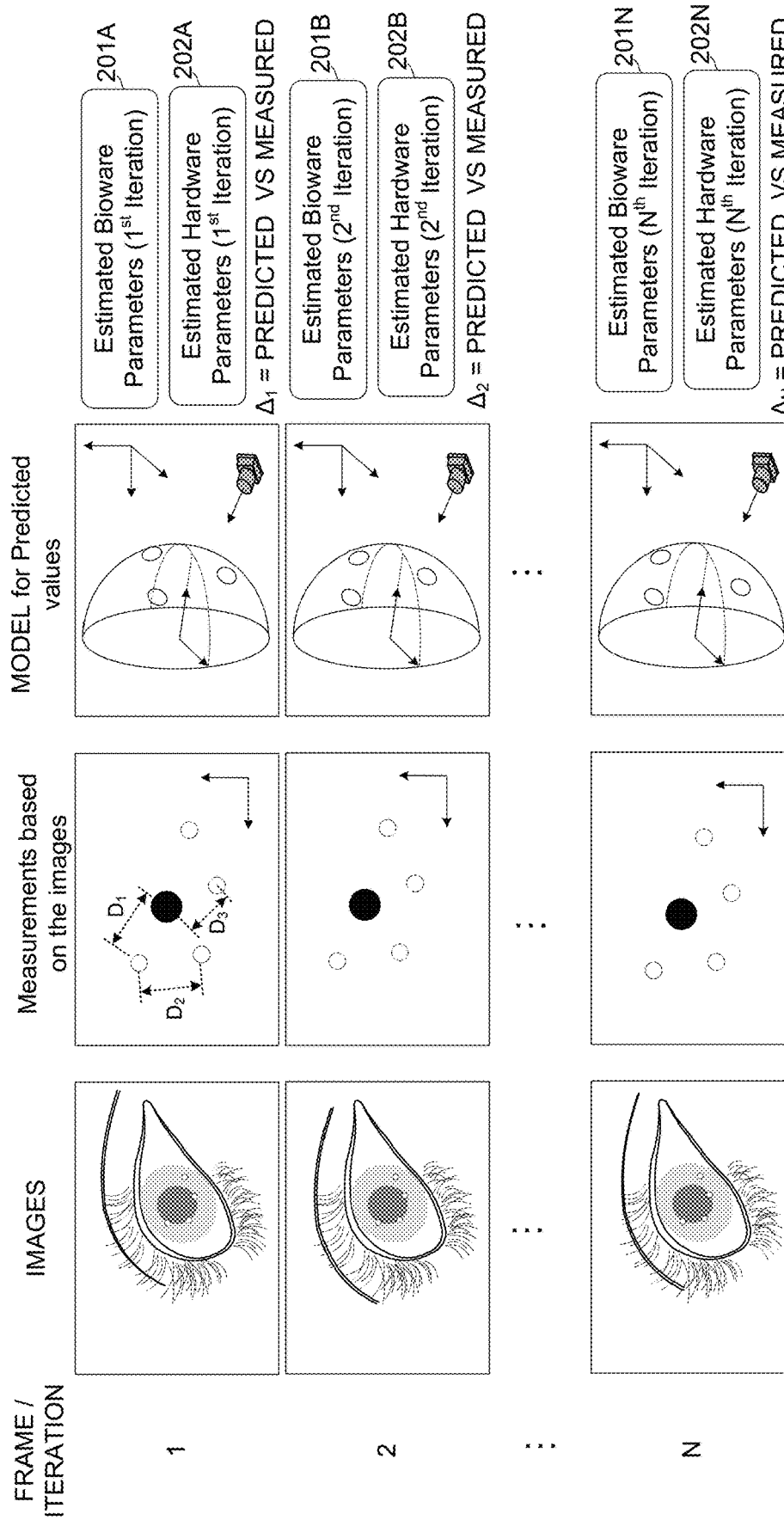
FIG. 5 shows aspects of an iterative process for analyzing measured values and predicted values for pupil and glint positions.

In some configurations, the joint estimation of biological parameters and hardware parameters can involve an iterative process that may utilize multiple frames of image data. FIG. 5 shows an example of this iterative process. In this example, for each image frame, a device can use the position of the ocular features to generate biological estimation data 201A, 201B up to 201N defining biological parameters indicating an orientation 310 and a position 312 of the eye 10, wherein the orientation 310 and the position 312 of the eye 10 are estimated based on the position 108 of the plurality of glints 111 and the pupil position 109 of the pupil 110. The hardware estimation data 202A, 202B up to 202N defining one or more hardware parameters of the camera 101 can also be concurrently determined with the biological parameters for each frame. The one or more hardware parameters of the camera 101 can be estimated based on the position 108 of the plurality of glints 111, the pupil position 109 of the pupil 110, or any other ocular feature of the eye.

The joint estimation of the one or more hardware parameters of the camera 101 with the estimation of biological parameters indicating the orientation 310 and the position 312 of the eye 10 causes an adjustment to the orientation 310 and the position 312 of the eye 10 to accommodate deformations or other physical changes of the device 100. The joint estimation of the one or more hardware parameters of the camera with the estimation of the orientation and the position of the eye reduces a difference ("A" or "delta") between a predicted value of the pupil and glint positions based on a model and a measured value of the pupil and glint positions based on geometric calculations derived from the image data. The device can then make an adjustment to the estimated orientation and the position of the eye based on the difference between the predicted value and the measured value.

The system iterates through the frames and determines a predicted value of the pupil and glint positions based on a model and a measured value of the pupil and glint positions. The difference between the measured values and the predicted values can be driving to a lower value with each iteration. When the difference is less than a threshold difference, the system can utilize the predicted values and/or the measured values to determine the final output, which is an adjusted estimation of the position and/or orientation of the eye. The difference, also referred to herein as the error, can be driven to a lower level by using one or more measurements as an input to the model, and by doing so the difference of the measured value and predicted value of the model will gradually decrease.

In one example, the device can determine a measured value of the pupil and glint positions using one or more geometric measurements from the image data depicting the eye. This can include measurements of distances, e.g., D1, D2, and D3, between the ocular features such as distances between the glints and the distances between each glint and a pupil center. These distances can be used with other predetermined values, such as a position of the camera or a position of the lights that can be measured at calibration or a previous iteration of the calibration process described herein. These measurements can be used to determine pupil and glint positions relative to a coordinate system. In some embodiments, measurement data can be generated in the measurement data can include a list of distances, locations, a number of glints, and other data describing properties of each ocular feature.

The device can also determine a predicted value of the pupil and glint positions by the use of a model of the eye that is generated by the use of one or more predetermined values. The predetermined values can include, but is not limited to, factory measurements, data defining the general shape of the eye, etc. The geometric measurements and the vectors generated from the geometric measurements illustrated in FIG. 2 or FIG. 4 can also be utilized to generate a model for a particular frame. Model data can indicate a predicted value showing pupil and glint positions.

For illustrative purposes, consider a scenario where the measurements based on an analysis of the images produce measured values that are greater than a threshold difference than predicted values. This may occur when device has been subjected to a force or physical change, such as the example shown in FIG. 3. In this example, this difference in values can be detected using the first frame, frame/iteration 1. When the difference between the two values is greater than a threshold difference, the system can utilize one of the measurements, which may indicate a new position or orientation of a camera or a light (at $T_1$ of FIG. 3), as part of the generation of the model in a subsequent iteration. Thus, a measurement showing the camera position or the light position can be utilized in the generation of the model using image data from the second frame, e.g., frame/iteration 2. By using this measurement from the first iteration in the second iteration of the model, the difference between the measured value of the second frame and the predicted value will be reduced. The process causes a convergence of values.

Thus, the device can analyze the second frame of the image data depicting the eye to generate an updated model (frame 2) that is generated using the predicted value of the pupil and glint positions and the measured value of the pupil and glint positions (measurement from frame 1). Where the updated model defines an updated predicted value of the pupil and glint positions, where the updated value is associated with the second frame. Once the device determines that the difference between the updated predicted value and the measured value are less than a predetermined threshold, the system can use the updated model that defines an updated predicted value of the glint and pupil position to determine an output defining an orientation and position of the eye. Thus, the adjustment to the orientation and position of the eye can be done over a number of iterations. The final output defining the adjusted values of the orientation and position of the eye can be based on the predicted values and/or the measured values when the error is below a threshold. In some configurations, the accuracy of the device can be improved as the device utilizes more frames.

Figure 6:
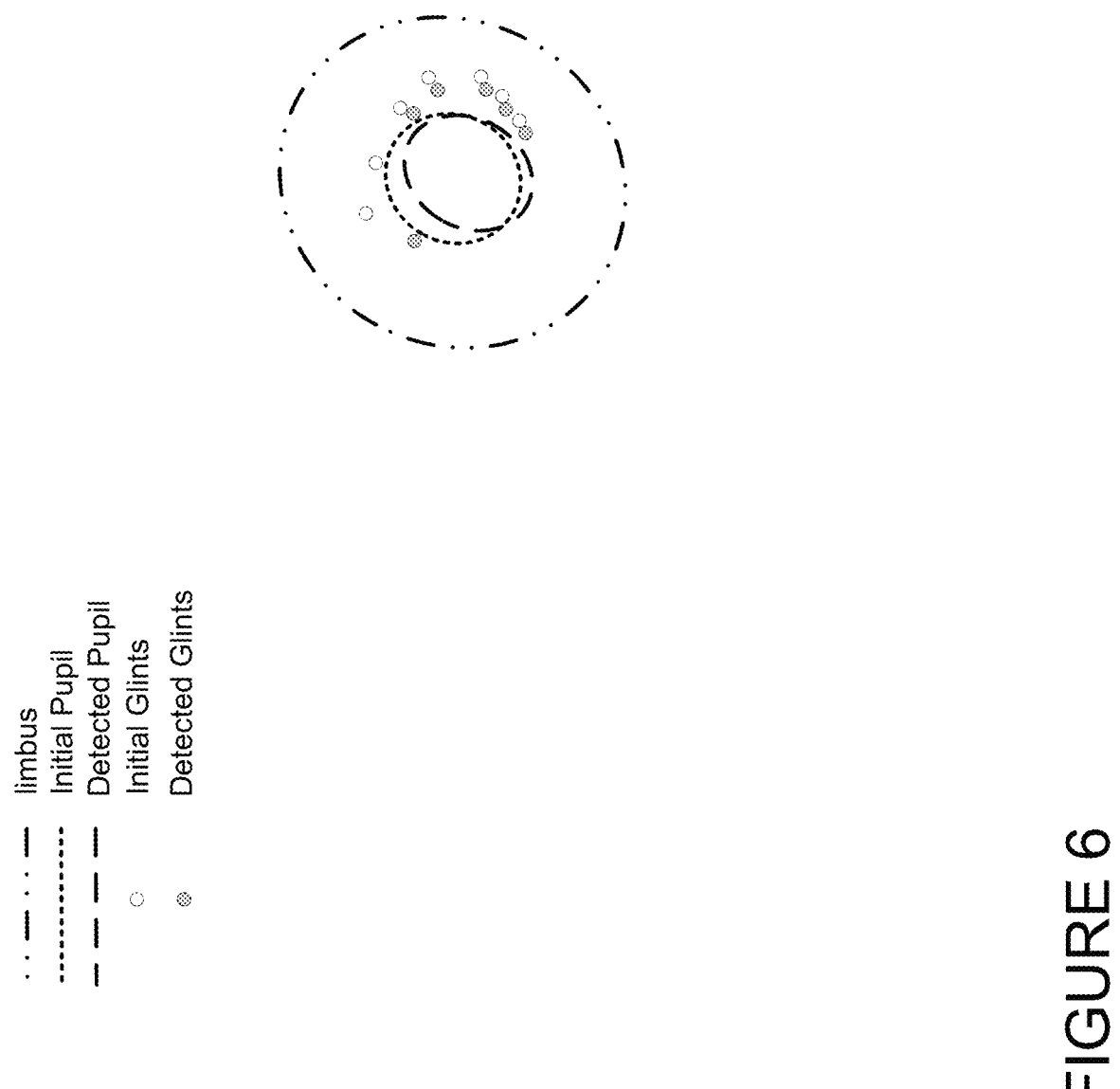
FIG. 6 shows aspects of initial measurements of glints and other ocular features and the results of a self-calibration process providing adjusted positions for the glints and other ocular features.

FIG. 6 shows how a model can change over time. In this example, a model of the initial pupil is shown relative to a detected pupil. Similarly, the initial glints are shown relative to the detected glints. The device can make such a detection even if the device is subjected to a physical change.

In some configurations, the hardware parameters may not always be utilized in an eye tracking process. Having a process that utilizes hardware parameters on a continual basis may utilize large amounts of computing resources. There could be potentially a very large number of hardware parameters utilized in the techniques disclosed herein. To help with computing resource efficiencies, some embodiments disclosed herein can select certain hardware parameters to be utilized in an eye tracking process. In addition, the techniques disclosed herein can create improved efficiencies by determining times or intervals in which the hardware parameters are utilized in an eye tracking process.

In one example, the device can select hardware parameters based on biological estimates meeting one or more criteria, e.g., the eye direction is off, the model is not accurate enough, or any indication that the known hardware parameters, e.g., camera tilt, are not correct. In this method, the system may determine a measured value of the pupil and glint positions using one or more geometric measurements from the image data depicting the eye. The system can then determine a predicted value of the pupil and glint positions by the use of a model of the eye that generated one or more predetermined values. The predetermined values can be what is previously known, e.g., factory measurements, predetermined models that define a general shape of the eye, etc. The system can then determine that the predicted value and the measured value meet one or more criteria. For example, the one or more criteria can be met when a difference between the measured value and the predicted value is greater than a predetermined threshold. In response to determining that the predicted value and the measured value meet one or more criteria, the system can select the one or more hardware parameters of the camera for use in the joint estimation with the biological parameters indicating the orientation and the position of the eye. When the hardware parameters are not selected the estimations the process can be performed using the biological parameters without the hardware parameters.

In some configurations, the system can select hardware parameters to be used in the joint estimation process in response to external measurements meeting one or more criteria. For example, a system can use other sensors to detect a change in temperature, an accelerometer to detect a threshold movement, other sensors to detect when the frame of the device 100 is bent.

In such embodiments, the system can determine that sensor data indicates that at least one of an acceleration of a device, a temperature of the device, or an applied force on the device meets one or more thresholds. In response to determining that sensor data indicates that at least one of the acceleration of the device, the temperature of the device, or the applied force on the device that exceeds one or more thresholds, the system can select the one or more hardware parameters of the device for use in the joint estimation of the biological parameters indicating the orientation and the position of the eye. The one or more hardware parameters can also be selected based on a device type, e.g., a plastic frame device experiencing a greater than threshold acceleration can select a position of a camera, orientation of the camera, or a tilt of a camera to be used in the joint estimation process. In such embodiments, the selected hardware parameters, which can include a set of hardware parameters, can be measured using image data as well as predicted using the models, and those hardware parameters can be utilized in the generation of updated models, as described above.

In addition to selecting hardware parameters, the system can determine the timing in which selected hardware parameters are used. The timing in which selected hardware parameters are used can involve the use of intervals or specific times. In the case of intervals, the system can identify a time interval, such as a second, minutes or hours, in which iterations of an eye tracking process can utilize hardware parameters. For instance, a system may track a position of a user's eye only using biological parameters for predetermined time. Once the system determines that a particular interval has passed, the system may utilize a hardware parameter in the joint estimation process described herein. In another example, the system can detect a particular event such as a threshold level of acceleration or an extreme temperature change, e.g., a temperature rate change exceeding a threshold. In such events or other events, the system may decide to utilize a select set of hardware parameters and one or more iterations of the joint estimation process.

In yet another example, the system may determine when hardware parameters are used based on a detected error level. In such an example, the system may determine a measured value of the pupil and glint positions using one or more geometric measurements from the image data depicting the eye. The system can also determine a predicted value of the pupil and glint positions by the use of a model of the eye that is generated by one or more predetermined values. In response to determining that the predicted value and the measured value meet one or more criteria, e.g., that the difference is greater than a predetermined threshold, the system may determine a time or interval to initiate the joint estimation of the one or more select hardware parameters of the camera, device, and/or other components of the device with the estimation of biological parameters indicating the orientation and the position of the eye. This can cause the system to adjust the orientation and the position of the eye when needed instead of running the joint estimation process using hardware parameters on a continual basis.

In another example, the system can determine when hardware parameters are to be used in a joint estimation process. This determination can be based on external sensor, e.g., a change in temperature, an accelerometer detects threshold movement, object is bent, etc. In such an example, the system can determine that sensor data indicates that at least one of an acceleration of a device, a temperature of the device, or an applied force on the device meets one or more thresholds. In response to determining that sensor data indicates that at least one of the acceleration of a device, the temperature of the device, or the applied force on the device meets one or more thresholds, the system can determine a time or interval to initiate the joint estimation of the one or more hardware parameters of the camera with the estimation of biological parameters indicating the orientation and the position of the eye for causing the adjustment to the final output, e.g., the orientation and the position of the eye.

These examples are provided for illustrative purposes and are not to be construed as limiting. It can be appreciated by one of ordinary skill in the art that any type of hardware parameter can be utilized. Although some of the examples disclosed herein involve estimations and utilization of hardware parameters specific to the camera, e.g., the position of the camera or the orientation of the camera, it can be appreciated that hardware parameters that apply to the device 100 can be estimated and utilized in the disclosed embodiments. For example, a position and the orientation of an LED, a position of the frame of the device, or any other parameter pertaining to the camera can be utilized.

Figure 7:
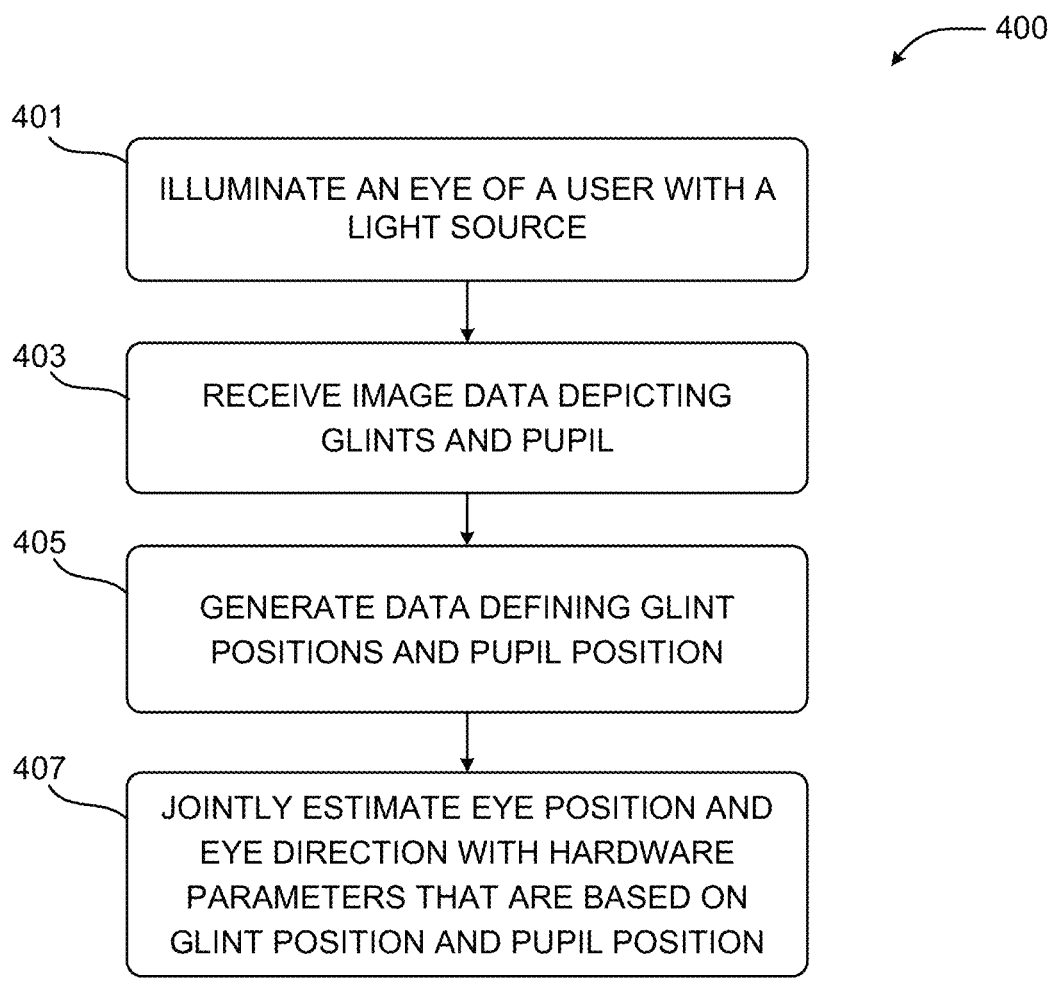
FIG. 7 is a flow diagram showing aspects of a routine for estimating hardware parameters jointly with estimating biological parameters to determine a position and orientation of an eye.

Turning now to FIG. 7, aspects of a routine 400 for tracking an eye of a user using joint estimation of hardware parameters and biological parameters are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an application, component and/or circuit, such as a device module 915 that can be included in any one of the memory components disclosed herein, including but not limited to RAM 914. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

With reference to FIG. 7, the routine 400 begins at operation 401, where the device illuminates an eye of a person using infrared light 102 directed toward the eye 10 from a plurality of light sources 103. The light sources can be optional depending on the ocular features that are used in the measurements. Each measurement and estimation can be based on any ocular features, not just the glints and pupils.

Next, at operation 403, the device can receive image data depicting the glints and pupil and/or other ocular features. Using that image data, the system can identify a plurality of glints 111 based on detected reflections of the infrared light 102 from the eye 10. Next, at operation 405, the system can then determine a pupil position 109 of a pupil 110 of the eye 10, wherein a position of the plurality of glints 111 and the pupil position 109 is determined by an analysis of image data generated by the camera 101. The pupil position 109 and the position of the plurality of glints 111 can be determined using any suitable a model and also using any predetermined values, such as a shape of an eye, predetermined positions and orientations of the lights and camera. The predetermined positions and orientations of the lights and camera can also be updated as the joint estimation process is executed. For instance, after determining a less than threshold difference of the measured versus predicated locations described above, the system may use any predicted or measured value for the shape of the eye or the position of the hardware as a predetermined value for a future iteration of the joint estimation process that may generate a model of the camera and/or eye.

Next, at operation 407, the device jointly generates biological estimation data 201A, 201B up to 201N and hardware estimation data 202A, 202B up to 202N. The biological estimation data 201A, 201B up to 201N can include a position and orientation of the user's eye, the hardware parameters can pertain to any parameter of the device such as the camera 101, a sensor, a frame of the device, etc. In some embodiments, the one or more hardware parameters of the camera 101 is estimated based on the position 108 of the plurality of glints 111 and the pupil position 109 of the pupil 110. The joint estimation of the one or more hardware parameters of the camera 101 with the estimation of biological parameters indicating the orientation 310 and the position 312 of the eye 10 causes an adjustment to the orientation 310 and the position 312 of the eye 10 to accommodate deformations or other physical changes of the device 100.

Figure 8:
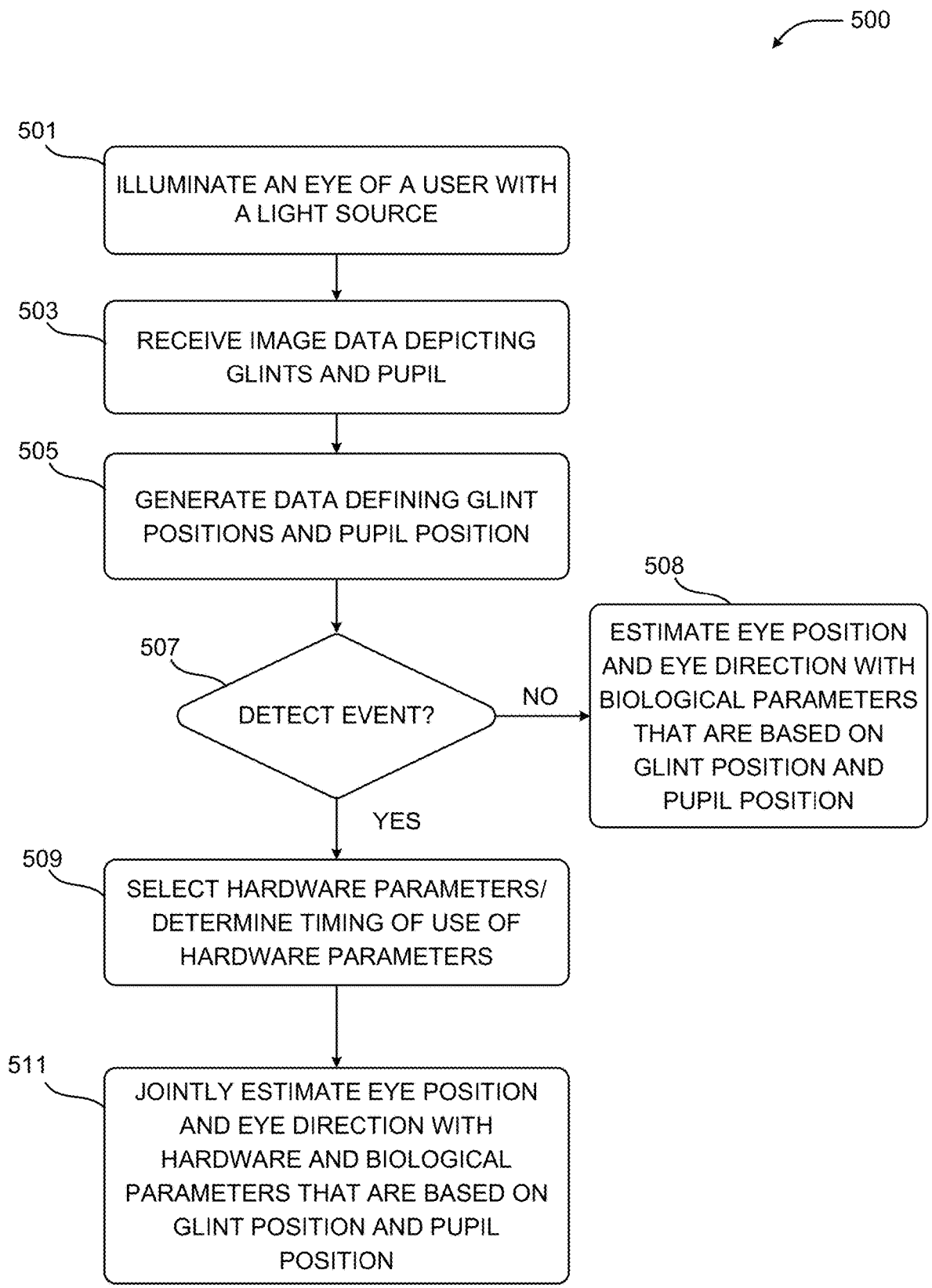
FIG. 8 is a flow diagram showing aspects of a routine for estimating hardware parameters jointly with estimating biological parameters to determine a position and orientation of an eye, wherein the selection and timing of hardware parameters are determined based on one or more detected events.

FIG. 8 shows another routine 500 where the device determines which hardware parameters to use in the joint estimation and when to use those hardware parameters in the joint estimation. In this process, operations 501 through 505 are similar to the operations described above for FIG. 7. However, in this embodiment, at operation 507, the device detects the presence of a predetermined event. The predetermined event can be a threshold level of error, e.g., a difference between a measured value and a predicted value being over a threshold, or the presence of an externally detected event such as a temperature change or an acceleration. If a predetermined event is not detected, the process proceeds to operation 508 where the device can track a user's eye only using biological parameters. The process can then continue and repeat itself by returning back to operation 501 from operation 508. Time intervals for this loop can depend on the presence or the detection of certain events. For instance, if an error level or a temperature change is greater than a threshold, and interval for repeating the process 501 through 508 can be more frequent or can be executed upon the detection of an event.

However, if a predetermined event is not detected at operation 507, the routine 500 proceeds to operation 509 where the device can select a hardware parameter and/or determine the timing in which a hardware parameter is utilized. For instance, if a difference between a predicted value and a measured value is greater than the threshold, the system may select the orientation and/or the location of the camera as a parameter that is used in the joint estimation process. The timing of the joint estimation can also be determined in operation 509. As described herein, the timing can involve the selection of a particular interval, or a particular time the joint estimation can be executed. The timing in which the joint estimation utilizes a hardware parameter can be based on one or more factors including a degree of a detected event, e.g., a threshold level of acceleration or a threshold temperature change over a period of time, etc. Those factors can also be combined with other contextual data such as the device type, the materials used to construct the device, a model number, etc.

Next, at operation 511, the device jointly generates biological estimation data 201A, 201B up to 201N and hardware estimation data 202A, 202B up to 202N. The biological estimation data 201A, 201B up to 201N can include a position and orientation of the user's eye, the hardware parameters can pertain to any parameter of the device such as the camera 101, a sensor, a frame of the device, etc. In some embodiments, the one or more hardware parameters of the camera 101 is estimated based on the position 108 of the plurality of glints 111 and the pupil position 109 of the pupil 110. The joint estimation of the one or more hardware parameters of the camera 101 with the estimation of biological parameters indicating the orientation 310 and the position 312 of the eye 10 causes an adjustment to the orientation 310 and the position 312 of the eye 10 to accommodate deformations or other physical changes of the device 100.

Turning now to FIG. 9, an illustrative computing device architecture 900 for a computing device that is capable of executing various software components described herein. The computing device architecture 900 is applicable to computing devices that facilitate mobile computing due, in part, to form factor, wireless connectivity, and/or battery-powered operation. The computing device architecture 900 can be the architecture of the device 100 of FIG. 1. In some configurations, the computing devices include, but are not limited to, a near-to-eye display device, e.g., glasses or a head mounted display unit. The computing device architecture 900 can also apply to any other device that may use or implement parts of the present disclosure, including, but not limited to, mobile telephones, tablet devices, slate devices, portable video game devices, and the like. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 9, the components can interact to carry out device functions. In some configurations, the components are arranged so as to communicate via one or more busses (represented by one or more lines between the components).

The memory components 904 is connected to the CPU 902 through a mass storage controller (not shown) and a bus. The memory components 904 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium," "non-transitory computer storage media" and variations thereof, does not include waves, signals, and/or other transitory and/or intangible communication media, per se.

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include random access memory ("RAM") 914, read-only memory ("ROM") 916, an integrated storage memory ("integrated storage") 918, or a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920. The RAM or any other component can also store the device module 915 or other software modules for causing execution of the operations described herein.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, California, and ANDROID OS from Google Inc. of Mountain View, California. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field. In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons. The camera can also include any type of sensor using any type of modality, e.g., a first modality may be under infrared, a second modality may be under a different spectrum, e.g., visible light, laser, etc. The camera may also include a time-of-flight sensor which can operate using any suitable medium, e.g., sonar, radar, etc. the camera can also be in the form of a lidar sensor for capturing images and distances device and will object in a surrounding environment.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component. The following clauses are to supplement the present disclosure.

Clause A. A method of tracking an eye (10) of a person (11) using a device (100) comprising a camera (101) directed to the eye (10), comprising: projecting infrared light (102) toward the eye (10) from a plurality of light sources (103); identifying a plurality of glints (111) based on detected reflections of the infrared light (102) from the eye (10); determining a pupil position (109) of a pupil (110) of the eye (10), wherein a position of the plurality of glints (111) and the pupil position (109) is determined by an analysis of image data generated by the camera (101); generating biological estimation data 201A, 201B up to 201N defining biological parameters indicating an orientation (310) and a position (312) of the eye (10), wherein the orientation (310) and the position (312) of the eye (10) are estimated based on the position (108) of the plurality of glints (111) and the pupil position (109) of the pupil (110); and generating hardware estimation data (202A, 202B up to 202N) defining one or more hardware parameters of the camera (101), wherein the one or more hardware parameters of the camera (101) is estimated based on the position (108) of the plurality of glints (111) and the pupil position (109) of the pupil (110), wherein a joint estimation of the one or more hardware parameters of the camera (101) with the estimation of biological parameters indicating the orientation (310) and the position (312) of the eye (10) causes an adjustment to the orientation (310) and the position (312) of the eye (10) to accommodate deformations or other physical changes of the device (100).

Clause B: The method of Clause A, wherein the joint estimation of the one or more hardware parameters of the camera (101) and the estimation of biological parameters includes generating a first set of estimated hardware parameters from a first image and generating a first set of estimated biological parameters from the first image, generating second set of estimated hardware parameters from a second image and generating a second set of estimated biological parameters from the second image, wherein the second set of estimated biological parameters is generated using the first set of estimated hardware parameters from the first image and at one or more measured values from the second image and one or more predetermined values, wherein the second set of estimated biological parameters includes at least one of a position of the eye or an orientation of the eye, wherein the adjustment to the orientation and the position of the eye to accommodate deformations or other physical changes of the device is based on the second set of estimated biological parameters, or wherein the adjustment to the orientation and the position of the eye to accommodate deformations or other physical changes of the device is the second set of estimated biological parameters. The first set of hardware parameters can include at least one of a first estimated position of the camera and a first estimated orientation of the camera, wherein the second set of estimated biological parameters is generated using at least one of the first estimated position of the camera or the first estimated orientation of the camera for determining the at least one of the position of the eye or the orientation of the eye. Thus, the adjustment may include using the second set of estimated biological parameters which may be based on a new camera position or a new camera orientation that is estimated from measurements of the glints, pupil position, or other ocular features.

Clause C: The method of Clauses A through B, wherein the one or more hardware parameters of the camera includes a direction of the camera. The estimated hardware parameters is the orientation of the camera relative to a coordinate system.

Clause D: The method of Clauses A through C, wherein the one or more hardware parameters of the camera includes a position of the camera. The estimated hardware parameter is the position of the camera relative to a coordinate system.

Clause E: The method of Clauses A through D, wherein the joint estimation of the one or more hardware parameters of the camera with the estimation of the orientation and the position of the eye reduces a difference between a predicted value of the pupil and glint positions based on a model and a measured value of the pupil and glint positions derived from the image data, wherein the adjustment to the orientation and the position of the eye is determined based on the difference between the predicted value and the measured value.

Figure 4:
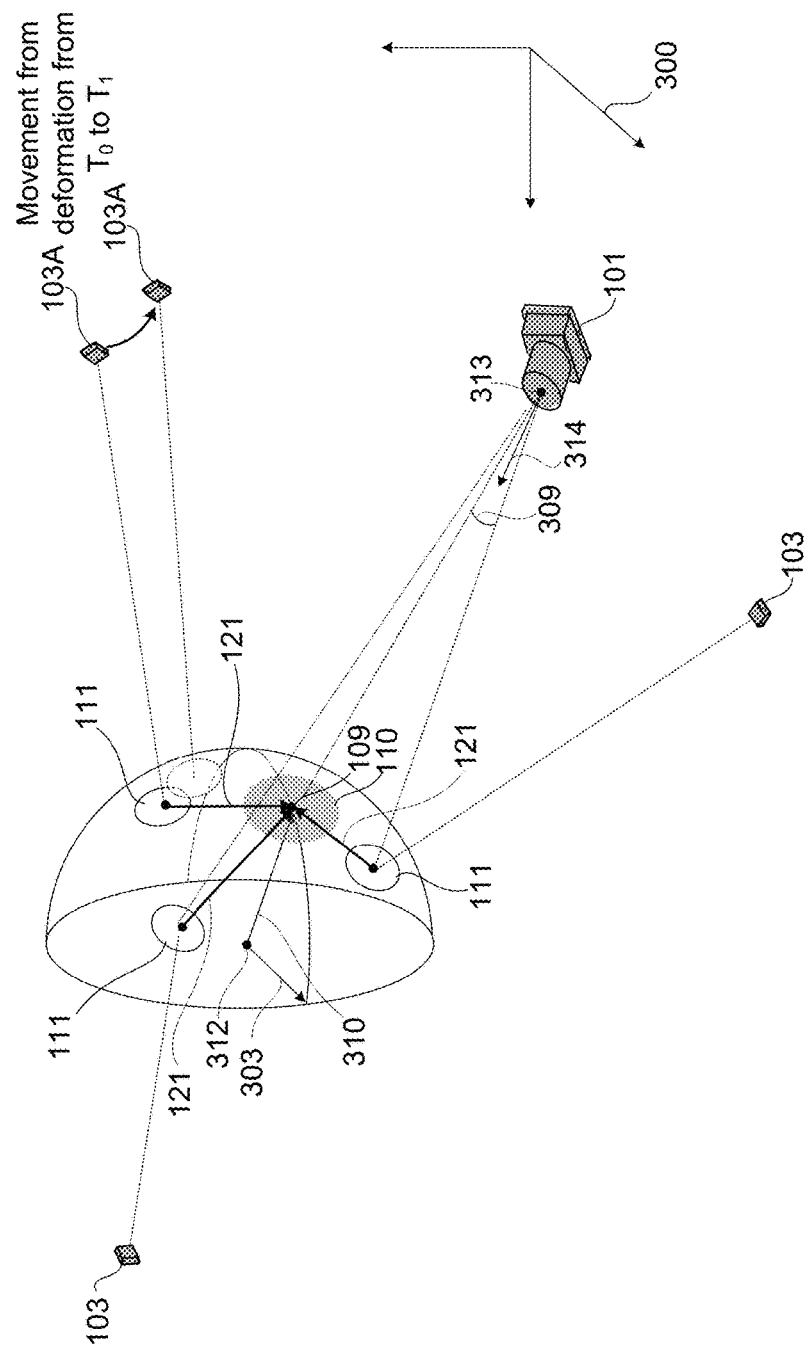
FIG. 4 is a perspective view of a model showing a physical change of a device that impacts a position of light sources relative to a sensor.

Clause F: The method of Clauses A through E, further comprising: determining a measured value of the pupil and glint positions using one or more geometric measurements from the image data depicting the eye; determining a predicted value of the pupil and glint positions by the use of a model of the eye that is generated from one or more predetermined values; in the next step, the model is updated using the predicted value and a measured value, e.g., a measurement indicating a new position of the hardware, the updated model having a new predicted value that has less error than the first model; analyzing individual images of the image data depicting the eye to generate an updated model that is generated using the predicted value of the pupil and glint positions and the measured value of the pupil and glint positions, wherein the updated model defines an updated predicted value of the pupil and glint positions; determining that the difference between the updated predicted value and the measured value is less than a predetermined threshold; and using the updated model to determine the final output: the orientation and the position of the eye; in response to determining that the difference between the updated predicted value and the measured value is less than the predetermined threshold, determine the adjustment to the orientation and the position of the eye based on the updated predicted value of the pupil and glint positions. As shown in FIG. 4, the joint estimation can use multiple image frames for refining the measured and predicted values.

Clause G: The method of Clauses A through F, further comprising: determining a measured value of the pupil and glint positions using one or more geometric measurements from the image data depicting the eye; determining a predicted value of the pupil and glint positions by the use of a model of the eye that is generated from one or more predetermined values; determining that the predicted value and the measured value meet one or more criteria, wherein one or more criteria is met when a difference is greater than a predetermined threshold; and in response to determining that the predicted value and the measured value meet one or more criteria, selecting the one or more hardware parameters of the camera for use in the joint estimation of the biological parameters indicating the orientation and the position of the eye. Some embodiments can select hardware parameters to estimate based on biological estimates meeting one or more criteria, e.g., the eye direction is off, the model is not accurate enough, or any indication that the known hardware parameters, e.g., tilt, is not correct anymore.

Clause H: The method of Clauses A through G, further comprising: determining that sensor data indicates that at least one of an acceleration of a device, a temperature of the device, or an applied force on the device meets one or more thresholds; and in response to determining that sensor data indicates that at least one of the acceleration of a device, the temperature of the device, or the applied force on the device exceeds one or more thresholds, selecting the one or more hardware parameters of the camera for use in the joint estimation of the biological parameters indicating the orientation and the position of the eye. Some embodiments can include selecting hardware parameters to estimate based on external measurements meeting one or more criteria, e.g., a change in temperature, an accelerometer detects threshold movement, object is bent.

Clause I: The method of Clauses A through H, further comprising: determining a measured value of the pupil and glint positions using one or more geometric measurements from the image data depicting the eye; determining a predicted value of the pupil and glint positions by the use of a model of the eye that is generated from one or more predetermined values; determining that the predicted value and the measured value meet one or more criteria; and in response to determining that the predicted value and the measured value meet one or more criteria, determining a time to initiate the joint estimation of the one or more hardware parameters of the camera with the estimation of biological parameters indicating the orientation and the position of the eye for causing the adjustment to the orientation and the position of the eye.

Clause J: The method of Clauses A through I, further comprising: determining that sensor data indicates that at least one of an acceleration of a device, a temperature of the device, or an applied force on the device meets one or more thresholds; in response to determining that sensor data indicates that at least one of the acceleration of a device, the temperature of the device, or the applied force on the device meets one or more thresholds, determining a time to initiate the joint estimation of the one or more hardware parameters of the camera with the estimation of biological parameters indicating the orientation and the position of the eye for causing the adjustment to the orientation and the position of the eye.

Clause K: A system (100) for tracking an eye (10) of a person (11) using a device (100) comprising a camera (101) directed to the eye (10), the system comprising: one or more processing units (902); and a computer-readable storage medium (904) having encoded thereon computer-executable instructions to cause the one or more processing units (902) to perform a method comprising: determining a position of one or more ocular features (110 or 111) of the eye (10), wherein the position of the one or more ocular features are determined by an analysis of image data generated by the camera (101); generating biological estimation data 201A, 201B up to 201N defining biological parameters indicating an orientation (310) and a position (312) of the eye (10), wherein the orientation (310) and the position (312) of the eye (10) are estimated based on the position of the one or more ocular features (110); and generating hardware estimation data (202A, 202B up to 202N) defining one or more hardware parameters of the device (100), wherein the one or more hardware parameters of the device (100) is estimated based on the position of the one or more ocular features (110), wherein a joint estimation of the one or more hardware parameters of the device (100) with the estimation of biological parameters indicating the orientation (310) and the position (312) of the eye (10) causes an adjustment to the orientation (310) and the position (312) of the eye (10) to accommodate deformations or other physical changes of the device (100).

Clause L: The system of Clause K, wherein the one or more hardware parameters of the device includes a direction of the camera.

Clause M: The system of Clauses K through L, wherein the one or more hardware parameters of the device includes a position of the camera.

Clause N: The system of Clauses K through M, wherein the joint estimation of the one or more hardware parameters of the device with the estimation of the orientation and the position of the eye reduces a difference between a predicted value of a position of the one or more ocular features based on a model of the eye and a measured value of the position of the one or more ocular features based on geometric properties measured from the image data, wherein the adjustment to the orientation and the position of the eye is determined based on the difference between the predicted value and the measured value.

Clause O: The system of Clauses K through N, wherein the method further comprises: determining a measured value of a position of the one or more ocular features using one or more geometric measurements from the image data depicting the eye; determining a predicted value of the position of the one or more ocular features by the use of a model of the eye that is generated one or more predetermined values; analyzing individual images of the image data depicting the eye to generate an updated model that is generated using the predicted value of the position of the one or more ocular features of the eye and the measured value of the position of the one or more ocular features of the eye, wherein the updated model defines an updated predicted value of the position of the one or more ocular features; determining that the difference between the updated predicted value and the measured value is less than a predetermined threshold; and in response to determining that the difference between the updated predicted value and the measured value is less than the predetermined threshold, determine the adjustment to the orientation and the position of the eye based on the updated predicted value of the pupil and glint positions.

Clause P: A computer-readable storage medium (904) having encoded thereon computer-executable instructions to cause the one or more processing units (902) causing a system (100) to track an eye (10) of a person (11) a camera (101) directed to the eye (10), the executable instructions causing the system to perform a method of: determining a position of one or more ocular features (110 or 111) of the eye (10), wherein the position of the one or more ocular features are determined by an analysis of image data generated by the camera (101); generating biological estimation data (201A, 201B up to 201N) defining biological parameters indicating an orientation (310) and a position (312) of the eye (10), wherein the orientation (310) and the position (312) of the eye (10) are estimated based on the position of the one or more ocular features of the pupil (110); and generating hardware estimation data (202A, 202B up to 202N) defining one or more hardware parameters of the camera (101), wherein the one or more hardware parameters of the camera (101) is estimated based on the position of the one or more ocular features of the pupil (110), wherein a joint estimation of the one or more hardware parameters of the camera (101) with the estimation of biological parameters indicating the orientation (310) and the position (312) of the eye (10) causes an adjustment to the orientation (310) and the position (312) of the eye (10) to accommodate deformations or other physical changes of the device (100).

Clause Q: The computer-readable storage medium of Clause P, wherein the one or more hardware parameters of the camera includes a direction of the camera.

Clause R: The computer-readable storage medium of Clauses P through Q, wherein the one or more hardware parameters of the camera includes a position of the camera.

Clause S: The computer-readable storage medium of Clauses P through R, wherein the joint estimation of the one or more hardware parameters of the camera with the estimation of the orientation and the position of the eye reduces a difference between a predicted value of a position of the one or more ocular features based on a model of the eye and a measured value of the position of the one or more ocular features based on geometric properties measured from the image data, wherein the adjustment to the orientation and the position of the eye is determined based on the difference between the predicted value and the measured value.

Clause T: The computer-readable storage medium of Clauses P through S, wherein the method further comprises: determining that sensor data indicates that at least one of an acceleration of a device, a temperature of the device, or an applied force on the device meets one or more thresholds; and in response to determining that sensor data indicates that at least one of the acceleration of a device, the temperature of the device, or the applied force on the device exceeds one or more thresholds, selecting the one or more hardware parameters of the camera for use in the joint estimation of the biological parameters indicating the orientation and the position of the eye.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method of tracking an eye of a person using a device comprising a camera directed to the eye, comprising:
projecting infrared light toward the eye from a plurality of light sources;
identifying a plurality of glints based on detected reflections of the infrared light from the eye;
determining a pupil position of a pupil of the eye, wherein a position of the plurality of glints and the pupil position is determined by an analysis of image data generated by the camera;
generating biological estimation data defining biological parameters indicating an orientation and a position of the eye, wherein the orientation and the position of the eye are estimated based on the position of the plurality of glints and the pupil position of the pupil;
determining that sensor data from at least one of a plurality of external sensors exceeds one or more thresholds;
in response to determining that the sensor data from the at least one of the plurality of external sensors exceeds the one or more thresholds, selecting one or more hardware parameters of the camera for use in a joint estimation with the estimation of biological parameters indicating the orientation and the position of the eye; and
generating hardware estimation data defining the one or more hardware parameters of the camera, wherein the one or more hardware parameters of the camera is estimated based on the position of the plurality of glints and the pupil position of the pupil, wherein the joint estimation of the one or more hardware parameters of the camera with the estimation of biological parameters indicating the orientation and the position of the eye causes an adjustment to the orientation and the position of the eye to accommodate deformations or other physical changes of the device.

2. The method of claim 1, wherein the joint estimation of the one or more hardware parameters of the camera and the estimation of biological parameters comprises generating a first set of estimated hardware parameters from a first image and generating a first set of estimated biological parameters from the first image, generating a second set of estimated hardware parameters from a second image and generating a second set of estimated biological parameters from the second image, wherein the second set of estimated biological parameters is generated using the first set of estimated hardware parameters from the first image and at one or more measured values from the second image and one or more predetermined values for generating a model, wherein the estimated biological parameters includes at least one of the position of the eye or the orientation of the eye.

3. The method of claim 1, wherein the one or more hardware parameters of the camera includes a direction of the camera.

4. The method of claim 1, wherein the one or more hardware parameters of the camera includes a position of the camera.

5. The method of claim 1, wherein the joint estimation of the one or more hardware parameters of the camera with the estimation of the orientation and the position of the eye reduces a difference between a predicted value of the pupil and glint positions based on a model and a measured value of the pupil and glint positions derived from the image data, wherein the adjustment to the orientation and the position of the eye is determined based on the difference between the predicted value and the measured value.

6. The method of claim 1, further comprising:
   determining a measured value of the pupil and glint positions using one or more geometric measurements from the image data depicting the eye;
   determining a predicted value of the pupil and glint positions by use of a model of the eye that is generated from one or more predetermined values;
   analyzing individual images of the image data depicting the eye to generate an updated model that is generated using the predicted value of the pupil and glint positions and the measured value of the pupil and glint positions, wherein the updated model defines an updated predicted value of the pupil and glint positions;
   determining that a difference between the updated predicted value and the measured value is less than a predetermined threshold; and
   in response to determining that the difference between the updated predicted value and the measured value is less than the predetermined threshold, determine the adjustment to the orientation and the position of the eye based on the updated predicted value of the pupil and glint positions.

7. The method of claim 1, further comprising:
   determining a measured value of the pupil and glint positions using one or more geometric measurements from the image data depicting the eye;
   determining a predicted value of the pupil and glint positions by use of a model of the eye that is generated from one or more predetermined values;
   determining that the predicted value and the measured value meet one or more criteria, wherein the one or more criteria is met when a difference is greater than a predetermined threshold; and
   in response to determining that the predicted value and the measured value meet the one or more criteria, selecting the one or more hardware parameters of the camera for use in the joint estimation of the biological parameters indicating the orientation and the position of the eye.

8. The method of claim 1, wherein the external sensors are at least one of an accelerometer, a temperature sensor, or a sensor to detect when a frame of the device is bent.

9. The method of claim 1, further comprising:
   determining a measured value of the pupil and glint positions using one or more geometric measurements from the image data depicting the eye;
   determining a predicted value of the pupil and glint positions by the use of a model of the eye that is generated from one or more predetermined values;
   determining that the predicted value and the measured value meet one or more criteria; and
   in response to determining that the predicted value and the measured value meet the one or more criteria, determining a time to initiate the joint estimation of the one or more hardware parameters of the camera with the estimation of biological parameters indicating the orientation and the position of the eye for causing the adjustment to the orientation and the position of the eye.

10. The method of claim 1, further comprising:
    determining that the sensor data indicates that at least one of an acceleration of the device, a temperature of the device, or an applied force on the device meets one or more thresholds;
    in response to determining that sensor data indicates that at least one of the acceleration of the device, the temperature of the device, or the applied force on the device meets one or more thresholds, determining a time to initiate the joint estimation of the one or more hardware parameters of the camera with the estimation of biological parameters indicating the orientation and the position of the eye for causing the adjustment to the orientation and the position of the eye.

11. A system for tracking an eye of a person using a device comprising a camera directed to the eye, the system comprising:
    one or more processing units; and
    a computer-readable storage medium having encoded thereon computer-executable instructions to cause the one or more processing units to perform a method comprising:
    determining a position of one or more ocular features of the eye, wherein the position of the one or more ocular features are determined by an analysis of image data generated by the camera;
    generating biological estimation data defining biological parameters indicating an orientation and a position of the eye, wherein the orientation and the position of the eye are estimated based on the position of the one or more ocular features;
    determining that sensor data from at least one of a plurality of external sensors exceeds one or more thresholds;
    in response to determining that the sensor data from the at least one of the plurality of external sensors exceeds the one or more thresholds, selecting one or more hardware parameters of the camera for use in a joint estimation with the estimation of biological parameters indicating the orientation and the position of the eye; and
    generating hardware estimation data defining the one or more hardware parameters of the device, wherein the one or more hardware parameters of the device is estimated based on the position of the one or more ocular features, wherein the joint estimation of the one or more hardware parameters of the device with the estimation of biological parameters indicating the orientation and the position of the eye causes an adjustment to the orientation and the position of the eye to accommodate deformations or other physical changes of the device.

12. The system of claim 11, wherein the one or more hardware parameters of the device includes a direction of the camera.

13. The system of claim 11, wherein the one or more hardware parameters of the device includes a position of the camera.

14. The system of claim 11, wherein the joint estimation of the one or more hardware parameters of the device with the estimation of the orientation and the position of the eye reduces a difference between a predicted value of the position of the one or more ocular features based on a model of the eye and a measured value of the position of the one or more ocular features based on geometric properties measured from the image data, wherein the adjustment to the orientation and the position of the eye is determined based on the difference between the predicted value and the measured value.

15. The system of claim 11, wherein the method further comprises:
- determining a measured value of the position of the one or more ocular features using one or more geometric measurements from the image data depicting the eye;
- determining a predicted value of the position of the one or more ocular features by the use of a model of the eye that is generated from one or more predetermined values;
- analyzing individual images of the image data depicting the eye to generate an updated model that is generated using the predicted value of the position of the one or more ocular features of the eye and the measured value of the position of the one or more ocular features of the eye, wherein the updated model defines an updated predicted value of the position of the one or more ocular features;
- determining that the difference between the updated predicted value and the measured value is less than a predetermined threshold; and
- in response to determining that the difference between the updated predicted value and the measured value is less than the predetermined threshold, determine the adjustment to the orientation and the position of the eye based on the updated predicted value of the pupil and glint positions.

16. A computer-readable storage medium having encoded thereon computer-executable instructions to cause one or more processing units to cause a system to track an eye of a person using a device having a camera directed to the eye of the person, the executable instructions causing the system to perform a method of:
- determining a position of one or more ocular features of the eye, wherein the position of the one or more ocular features are determined by an analysis of image data generated by the camera;
- generating biological estimation data defining biological parameters indicating an orientation and a position of the eye, wherein the orientation and the position of the eye are estimated based on the position of the one or more ocular features of the eye;
- determining that sensor data from at least one of a plurality of external sensors exceeds one or more thresholds;
- in response to determining that the sensor data from the at least one of the plurality of external sensors exceeds the one or more thresholds, determining one or more hardware parameters of the camera for use in a joint estimation with the estimation of biological parameters indicating the orientation and the position of the eye; and
- generating hardware estimation data defining the one or more hardware parameters of the camera, wherein the one or more hardware parameters of the camera is estimated based on the position of the one or more ocular features of the eye, wherein the joint estimation of the one or more hardware parameters of the camera with the estimation of biological parameters indicating the orientation and the position of the eye causes an adjustment to the orientation and the position of the eye to accommodate deformations or other physical changes of the device.

17. The computer-readable storage medium of claim 16, wherein the one or more hardware parameters of the camera includes a direction of the camera.

18. The computer-readable storage medium of claim 16, wherein the one or more hardware parameters of the camera includes a position of the camera.

19. The computer-readable storage medium of claim 16, wherein the joint estimation of the one or more hardware parameters of the camera with the estimation of the orientation and the position of the eye reduces a difference between a predicted value of the position of the one or more ocular features based on a model of the eye and a measured value of the position of the one or more ocular features based on geometric properties measured from the image data, wherein the adjustment to the orientation and the position of the eye is determined based on the difference between the predicted value and the measured value.

20. The computer-readable storage medium of claim 16, wherein the external sensors are at least one of an accelerometer, a temperature sensor, or a sensor to detect when a frame of the device is bent.

* * * * *